March 26, 1957 B. F. WILEY ET AL 2,786,351
FLOWMETER
Filed Aug. 9, 1954 3 Sheets-Sheet 1

INVENTORS
B. F. WILEY
R. A. DOUBT
BY
Hudson & Young
ATTORNEYS

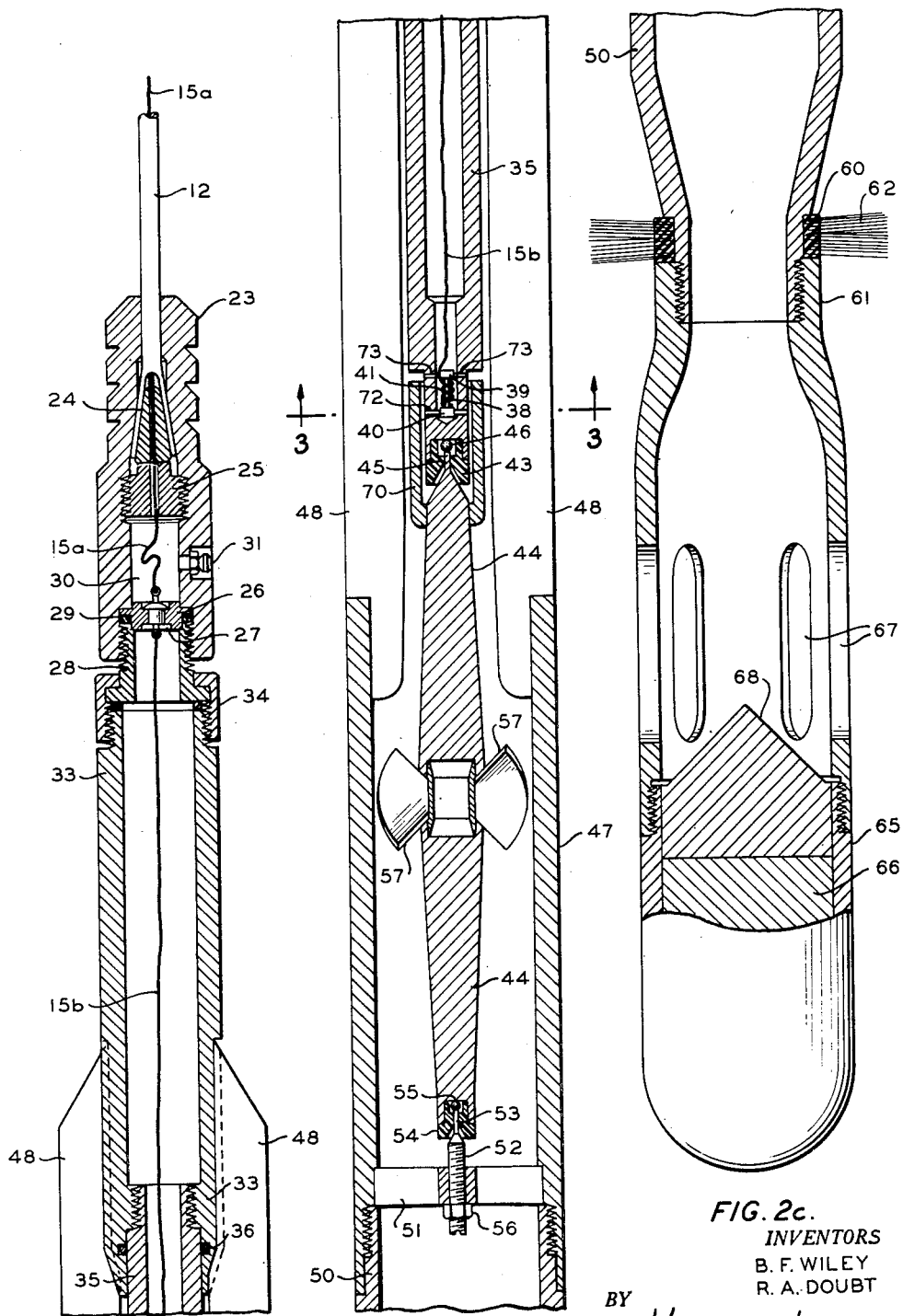

United States Patent Office 2,786,351
Patented Mar. 26, 1957

2,786,351

FLOWMETER

Bruce F. Wiley, Bartlesville, and Ralph A. Doubt, Ramona, Okla., assignors to Phillips Petroleum Company, a corporation of Delaware Application August 9, 1954, Serial No. 448,466

7 Claims. (Cl. 73—155)

This invention relates to flowmeters. In one specific aspect, it relates to a spinner type flowmeter which is adapted to be lowered into a well to measure fluid flow therethrough.

In certain oil producing operations, it is desirable to inject fluids through a bore hole into the surrounding earth formations. This is particularly true in water flooding operations wherein water is pumped into an injection well. The water flows outwardly through porous formations and displaces oil into an adjacent producing well. In operations of this type, it is important to determine the relative permeability of exposed zones and to measure the actual flow rates into these zones in order to control the rate of injection. One method that has been used for measuring such flow rates involves positioning a flowmeter within the input well. A first flow reading is taken near the top of the well and subsequent readings are taken at lower depths. The difference between the flow reading at the top of the well and at a selected depth is an indication of the amount of liquid that has entered the formations above the flowmeter. In addition, bore hole flowmeters are useful in direct oil producing operations to measure the flow from selected formations.

In accordance with the present invention, there is provided an improved spinner type flowmeter assembly for measuring fluid flow through bore holes. This assembly comprises an elongated casing having a central passage therethrough. The casing is provided with openings at the upper and lower ends to direct fluid through the central passage. A flexible packing device is secured to the casing intermediate the two openings and extends outwardly to engage the sides of the bore hole. This packer directs the total flow through the central passage of the casing. A spinner assembly is mounted by nylon bearings within the central passage to rotate at a speed representative of the flow rate through the passage. The speed of rotation of the spinner is measured by a telemetering assembly which comprises a magnet having spaced pole pieces. First pins of magnetic material extend outwardly from the two pole pieces. A coil is mounted on the magnet and the end terminals thereof are connected to indicating equipment at the surface of the bore hole. One or more second pins of magnetic material are carried by the spinner assembly in a manner such as to be rotated past the first pins to complete a magnetic path between the two pole pieces momentarily during each revolution of the spinner. This induces a voltage pulse in the coil which is amplified and indicated by the surface equipment.

Accordingly, it is an object of this invention to provide an improved spinner type flowmeter for measuring fluid flow through bore holes.

Another object of this invention is to provide a spinner flowmeter having a plurality of fins associated therewith to direct the fluid in a path substantially parallel to the axis about which the spinner rotates.

A further object is to provide a spinner type bore hole flowmeter having a flexible packer connected thereto to direct the total flow through the bore hole past the spinner blades.

A still further object is to provide an improved telemetering assembly to transmit the speed of rotation of a body to a second location spaced from the body.

Other objects, advantages and features of the invention should become apparent from the following detailed description taken in conjunction with the accompanying drawing in which:

Figures 2a, 2b and 2c are detailed views, shown partially in section, of the flowmeter assembly;

Figures 1, 3:
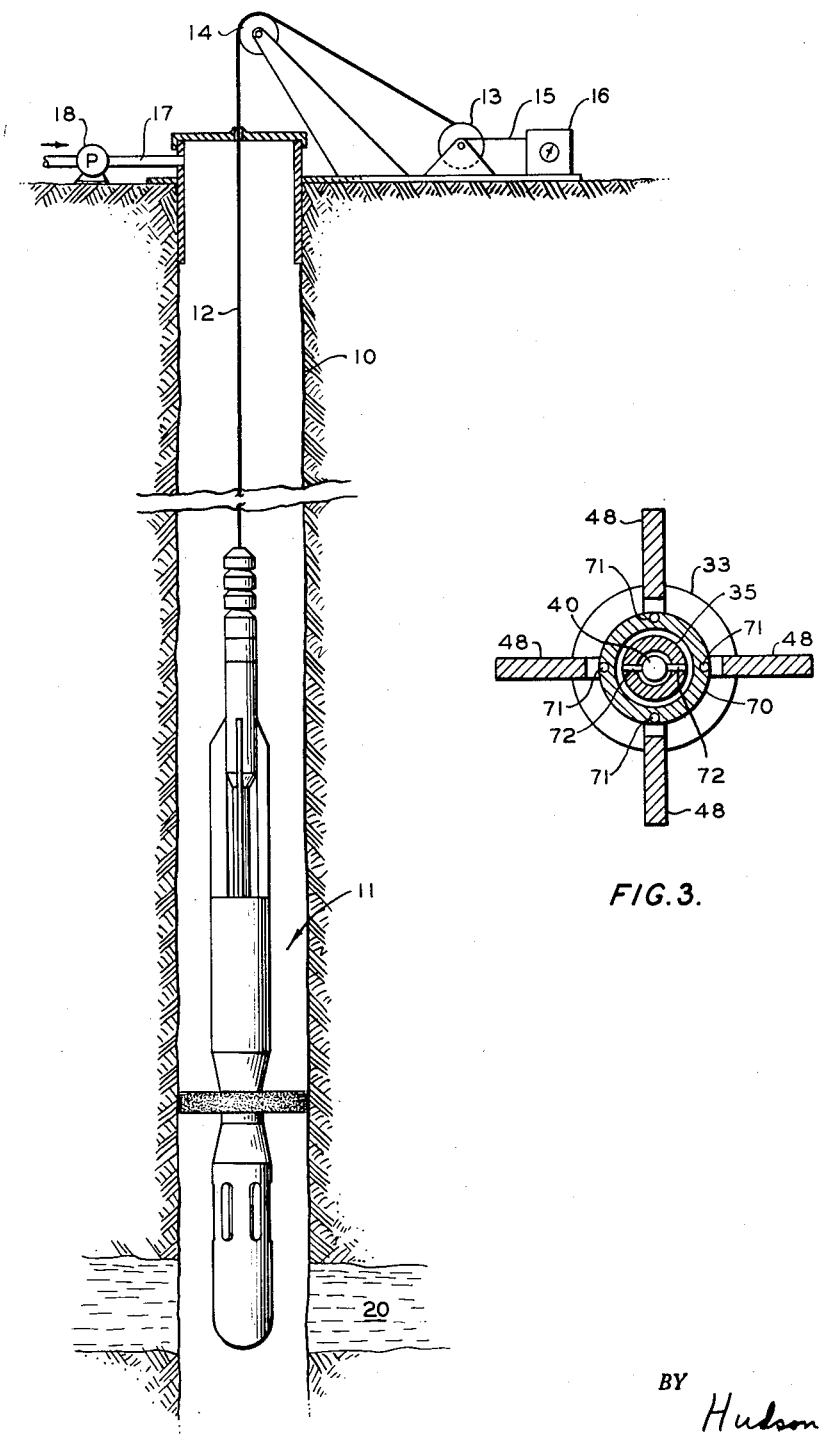
Figure 1 is a schematic view of the flowmeter assembly of this invention disposed in a water injection input well.
Figure 3 is a sectional view taken along line 3—3 in Figure 2b.

Referring now to the drawing in detail and to Figure 1 in particular, there is shown a water input well 10 having the flowmeter assembly of this invention disposed therein. This assembly comprises a casing 11 which is suspended within well 10 by a cable 12 which extends from a reel 13 at the surface over a guide wheel 14 into the well. Cable 12 contains an electrical lead which terminates at a slip ring mounted on drum 13. A lead 15 extends from a brush on drum 13 to a housing 16 which contains the surface electrical equipment. The top of well 10 is sealed and water is forced into the well through a conduit 17 having a pump 18 therein. Water flows downwardly through well 10 and flowmeter 11 and enters a porous formation, such as shown at 20. The flowmeter initially is positioned near the top of well 10 and a first flow reading is obtained with water being pumped into well 10 at a constant rate. Additional readings are then taken at successively lower depths. The difference in flow readings between the top location and a lower location is an indication of thte fluid flow into formations between the two zones. In this manner, a complete injection profile of the well can be obtained.

Flowmeter assembly 11 is shown in detail in Figures 2a, 2b and 2c. Cable 12, Figure 2a, contains an electrical lead 15a. The lower end of the sheath of cable 12 is split into a plurality of segments and is inserted through the top opening in a cable coupling housing 23. A wedge 24 is forced into engagement with the segments of cable 12 by a locking nut 25 which thereby secures housing 23 rigidly to cable 12. Electrical lead 15a extends through a central opening in wedge 24 and locking nut 25. A retaining plate 26 having a plug 27 therein is positioned within the lower portion of housing 23 and locked in place by a bushing 28 which is threaded into the bottom of housing 23. An O-ring 29 is disposed between bushing 28 and retaining plate 26. The chamber 30 formed in housing 23 between locking nut 25 and retaining plate 26 can be filled with hydraulic fluid by means of a fitting 31 in the side of housing 23. A casing 33 is attached to the lower end of bushing 28 by a collar 34.

As illustrated in Figure 2a, a non-magnetic stem 35 is threaded to the lower end of casing 33 and depends therefrom. An O-ring 36 is disposed between stem 35 and casing 33. A spool-shaped permanent magnet 38, Figure 2b, having respective upper and lower pole pieces 39 and 40, is positioned within stem 35. A coil 41 is wound on magnet 38. One end terminal of coil 41 is electrically connected to stem 35 which forms a ground connection, and the second end terminal of coil 41 is attached to an electrical lead 15b which extends upwardly through stem 35, and, as shown in Figure 2a, upward through casing 33 and bushing 28 to the lower terminal in plug 27. The upper terminal in plug 27 is connected to lead 15a.

A bearing 43, Figure 2b, which preferably is formed of nylon or similar material, is fitted into the bottom of stem 35. A shaft 44, having an elongated cylindrical upper end 45, is positioned beneath stem 35 such that end 45 extends into bearing 43. A steel ball 46 is contained within bearing 43 in engagement with the lower end of stem 35 and the upper end of shaft 44. A hollow cylindrical housing 47 encloses shaft 44. This housing is suspended from casing 33 by a plurality of fins 48 which are attached to casing 33 at their upper ends and to housing 47 at their lower ends. A throat member 50 is threaded to the lower end of housing 47. A spider 51 is mounted between housing 47 and throat member 50. This spider supports an adjusting screw 52 which has an elongated cylindrical upper end 53. The lower end of shaft 44 supports a second nylon bearing 54 which in turn receives the upper end 53 of screw 52. A steel ball 55 is contained within bearing 54 between shaft 44 and screw 53. A plurality of spinner blades 57 is attached to the center portion of shaft 44. In this manner, shaft 44 and blades 57 are free to rotate within housing 47 whenever fluid is directed through the housing.

The lower end of throat member 50, Figure 2e, supports a rubber ring 60 which is secured in position by a sleeve 61 which is threaded to throat member 50. Bristles 62 are embedded in ring 60 and extend outwardly therefrom to engage the walls of the bore hole. These bristles preferably are impregnated with grease to form a fluid tight seal with the wall of the bore hole. The bristles are sufficiently flexible to allow movement of the assembly through the bore hole, while at the same time forming a fluid tight seal.

A plug 65 is threaded to the lower end of sleeve 61. This plug is filled with a mass of lead 66 which gives the assembly sufficient weight to move downwardly through the bore hole. A plurality of ports 67 is formed in sleeve 61 to define the second fluid opening in the flowmeter assembly. The first fluid opening is the region above housing 47 adjacent fins 48. A deflector 68 is positioned within plug 65 to direct liquid through ports 67.

With reference to Figures 2b and 3, it can be seen that a cup-shaped member 70 is supported by the upper end of shaft 44 and extends upwardly to enclose the portion of stem 35 adjacent magnet 38. Member 70 is formed of a non-magnetic material, but has a plurality of magnetic pins 71 secured thereto and extending the length of magnet 38. A first pair of pins 72 of magnetic material extends radially outward through stem 35 adjacent pole piece 40 of magnet 38. Pins 72 are spaced 180° from one another in a horizontal plane. A second pair of corresponding pins 73 extends radially outward through stem 35 adjacent pole piece 39. In this manner, a magnetic path is completed between the two pole pieces of magnet 38 through pins 72, 71 and 73 whenever pins 71 are positioned adjacent pins 72 and 73. This results in a voltage pulse being generated between the end terminals of coil 41. The illustrated device provides four such voltage pulses during each revolution of shaft 44. Obviously, fewer or more pulses can be provided by decreasing or increasing the number of pins 71.

Figure 4:
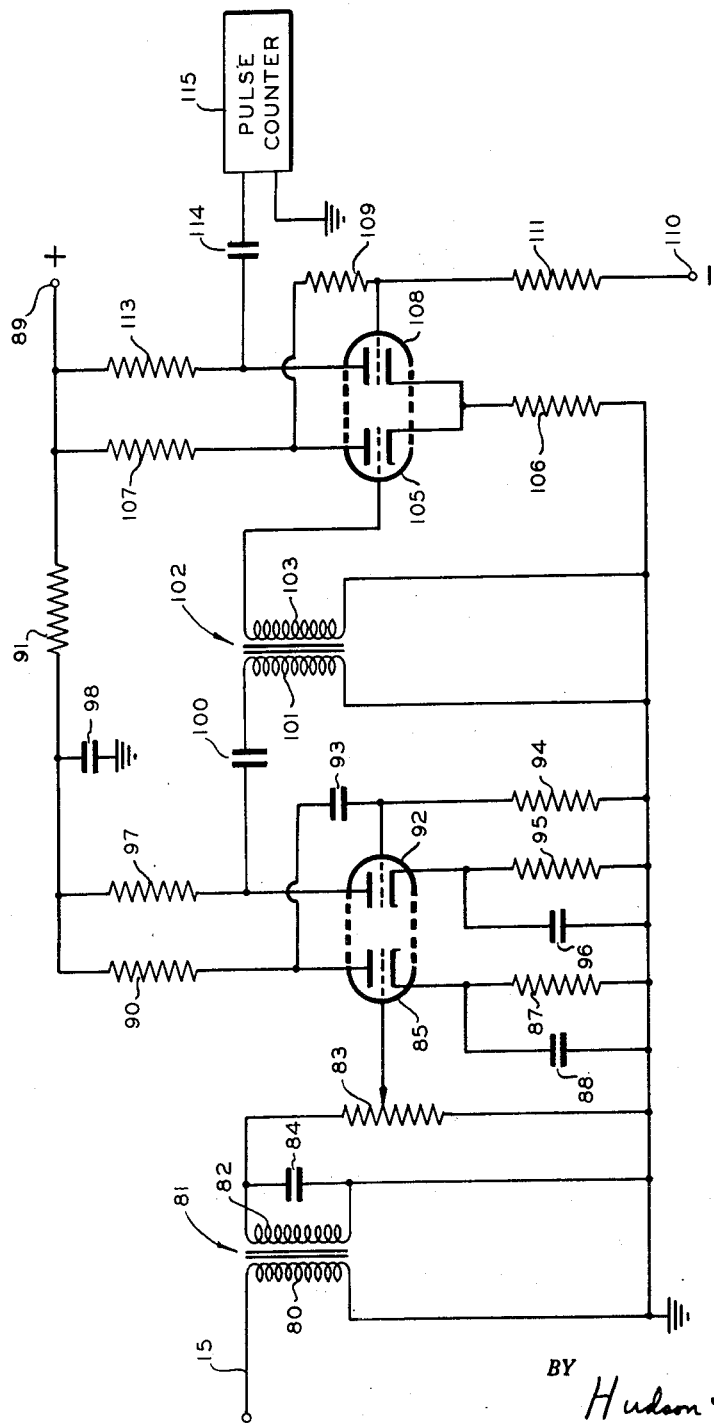
Figure 4 is a schematic circuit diagram of the speed of rotation indicating equipment.

The frequency of the electrical pulses generated across coil 41 is, therefore, a measurement of the speed of rotation of shaft 44, which in turn is a measurement of the rate at which fluid flows through housing 47. As previously mentioned, one terminal of coil 41 is connected to ground. The second terminal is connected by leads 15b, 15a and 15 to the indicating circuit positioned at the surface of the bore hole. This circuit is illustrated schematically in Figure 4.

Lead 15 is connected to one terminal of the primary winding 80 of an input transformer 81. The second end terminal of transformer winding 80 is connected to ground. The first end terminal of the secondary winding 82 of transformer 81 is connected to one end terminal of a potentiometer 83, the second end terminal of transformer winding 82 being connected to ground. A capacitor 84 is connected in parallel with transformer winding 82. The second end terminal of potentiometer 83 is connected to ground and the contactor thereof is connected to the control grid of a first triode 85. The cathode of triode 85 is connected to ground through a resistor 87 which is shunted by a capacitor 88. The anode of triode 85 is connected to a positive potential terminal 89 through series connected resistors 90 and 91. The anode of triode 85 is also connected to the control grid of a second triode 92 through a capacitor 93. The control grid of triode 92 is connected to ground through a resistor 94. The cathode of triode 92 is connected to ground through a resistor 95 which is shunted by a capacitor 96. The anode of triode 92 is connected to terminal 89 through series connected resistors 97 and 91, the junction between resistors 97 and 91 being connected to ground through a capacitor 98. The anode of triode 92 is also connected through a capacitor 100 to the first end terminal of the primary winding 101 of a transformer 102. The second end terminal of transformer winding 101 is connected to ground.

The first end terminal of the secondary winding 103 of transformer 102 is connected to the control grid of a third triode 105 and the second end terminal of transformer winding 103 is connected to ground. The cathode of triode 105 is connected to ground through a resistor 106. The anode of triode 105 is connected to terminal 89 through a resistor 107. The anode of triode 105 is also connected to the control grid of a fourth triode 108 through a resistor 109. The control grid of triode 108 is connected to a negative potential terminal 110 through a resistor 111. The cathode of triode 108 is connected to ground through resistor 106, and the anode of triode 108 is connected to potential terminal 89 through a resistor 113. The anode of triode 108 is also connected through an output capacitor 114 to the first input terminal of a pulse counter 115, the second input terminal of counter 115 being connected to ground.

The voltage pulses generated across coil 41 are thus amplified by triodes 85 and 92, and the amplified signal is applied to the input of a trigger circuit comprising triodes 105 and 108. The output signal from the trigger circuit is applied to a pulse counter which can include a pulse dividing circuit if necessary to accommodate high frequency pulse rates. The frequency of the pulses is, therefore, a function of the rate of fluid flow through housing 47 past spinner blades 57.

Fins 48 constitute an important feature of the flowmeter assembly because these fins direct the flow through housing 47 in a direction parallel to the axis about which shaft 44 rotates. This prevents the fluid from rotating with the spinner blades. While the assembly has been described in conjunction with an injection input well wherein the fluid flow is directed downwardly through housing 47, it should be apparent that the device can be used equally well in a producing well to measure the flow rate upwardly through housing 47. The packing assembly contributes to the accuracy of this flowmeter because all of the fluid flow through the bore hole is directed through the meter. If desired, shaft 44 can be replaced by a hollow shaft when the assembly is used in relatively shallow wells. While such an assembly is desirable in that the shaft tends to buoyed up to reduce friction on the bearings, it cannot be used conveniently in deep wells because the well pressure may cause the shaft to collapse.

While this invention has been described in conjunction with a present preferred embodiment, it should be apparent that the invention is not limited thereto.

What is claimed is:

1. Apparatus to measure the rate of fluid flow which comprises in combination, a spool-shaped magnet having pole pieces and positioned in a casing of non-magnetic material, a plurality of first bars of magnetic material radially extending in two generally horizontal planes from said pole pieces respectively, a coil enclosing said magnet and having terminal ends between which an electrical pulse is generated, a cup-shaped member of non-magnetic material surrounding the exterior of said casing, said member and said casing removed from the path of fluid flow, a plurality of second bars of magnetic material within said member and rotatable around said casing whereby said electrical pulse is generated, said second bars in axial alignment with said magnet, and a shaft having a plurality of blades whereby parallel fluid flow past said blades imparts rotation to said shaft, said shaft being connected to said member.

2. A flowmeter for indicating and recording the frequency of the occurrence of a plurality of electrical pulses generated proportional to fluid flow which comprises in combination, a spool-shaped magnet having pole pieces and positioned in a casing of non-magnetic material, a plurality of first bars of magnetic material radially extending in two generally horizontal planes from said pole pieces respectively, a coil enclosing said magnet and having terminal ends between which said electrical pulses are generated, a cup-shaped member of non-magnetic material surrounding the exterior of said casing, said member and said casing removed from the path of fluid flow, a plurality of second bars of magnetic material within said member and rotatable around said casing whereby said electrical pulses are generated, said second bars in axial alignment with said magnet, a shaft having a plurality of blades whereby parallel fluid flow past said blades imparts rotation to said shaft, said shaft being connected to said member, and means whereby said electrical pulses are conducted to indicating means which sense the rotation of said shaft.

3. A flowmeter for indicating and recording the frequency of the occurrence of a plurality of electrical pulses generated proportional to fluid flow which comprises in combination, a spool-shaped magnet having pole pieces and positioned in a casing of non-magnetic material, a plurality of first bars of magnetic material radially extending in two generally horizontal planees from said pole pieces respectively, a coil enclosing said magnet and having terminal ends between which said electrical pulses are generated, a cup-shaped member of non-magnetic material surrounding the exterior of said casing, said member and said casing removed from the path of fluid flow, a plurality of second bars of magnetic material within said member and rotatable around said casing whereby said electrical pulses are generated, said second bars in axial alignment with said magnet, a shaft having a plurality of blades whereby parallel fluid flow past said blades imparts rotation to said shaft, said shaft being connected to said member, the upper and lower ends of said shaft being cylindrical, first and second bearings to carry and support said upper and lower ends of said shaft respectively, said first and second bearings each having a ball within and provided with a cylindrical passage, an amplifier whereby said electrical pulses are amplified, means connecting said end terminals to the input terminals of said amplifier, and a pulse counter, the output terminals of said amplifier being connected to the input terminals of said pulse counter.

4. The combination in accordance with claim 1 further comprising an amplifier, means connecting the end terminals of said coil to the input terminals of said amplifier, and a pulse counter, the output terminals of said amplifier being connected to the input terminals of said pulse counter.

5. Apparatus to measure the rate of fluid flow, comprising, in combination, a magnet having separate pole pieces, a plurality of first bars of magnetic material radially extending in two generally horizontal planes from said pole pieces, a coil around said magnet and having terminal ends between which electrical pulses are generated, a cup-shaped member of non-magnetic material surrounding said magnet and said first bars, a plurality of second bars of magnetic material within said member and adjacent said first bars, said second bars being in axial alignment with said magnet, and a shaft having impeller means mounted thereon whereby fluid flow passing the same imparts rotation to said shaft, said member being attached to said shaft and rotatable therewith whereby said electrical pulses are generated.

6. A flow meter for determining the rate of flow of liquid through a well bore, comprising, in combination, a housing adapted to be lowered into said well bore, said housing having separated upper and lower casings, a plurality of fins attached at their respective ends to said upper and lower casings, said lower casing having fluid inlet openings in the lower extremity thereof, perforate support means mounted in said lower casing above said fluid openings, a shaft within said housing and positioned above said support means, a first bearing between said shaft and said support means and adapted to support said shaft at its lower end, a second bearing adjacent said upper casing near the lower extremity thereof, said shaft being rotatable between said first and second bearings, impeller means mounted on said shaft within said housing for rotation in response to fluid flow through said housing, a magnet having spaced pole pieces positioned in said upper casing, said magnet being positioned in a body of non-magnetic material, a plurality of first bars of magnetic material radially extending in two generally horizontal planes from said pole pieces, a cup-shaped member of non-magnetic material attached to said shaft and rotatable therewith, said member surrounding said magnet and said first bars, a plurality of second bars of magnetic material attached to said member, said second bars being in axial alignment with said magnet, said second bars so positioned in said member as to complete a magnetic path between said pole pieces, said first bars, and said second bars whenever said second bars are positioned adjacent said first bars, a coil enclosing said magnet and having terminal ends between which electrical pulses are generated when said shaft is caused to rotate, means to conduct said electrical pulses to a point exterior said well bore, and amplifying and indicating means operatively connected with said last-mentioned means at the surface of said well bore.

7. A flow meter for determining the rate of flow of liquid through a well bore, comprising, in combination, an elongated housing adapted to be lowered into said well bore by an insulated electrically conducting cable, said housing having separated upper and lower casings, a plurality of fins attached at their respective ends to said upper and lower casings, said housing having a weighted lower extremity and fluid openings thereabove, means to deflect the flow of fluid through said fluid openings upward into said housing, a flexible packer secured to said lower casing at a region intermediate the ends thereof, a cylindrical shaft centrally positioned within said housing, a spider mounted in said lower casing above said fluid openings and an adjustable cylindrical support extending upward from said spider, a first bearing carried by the lower end of said shaft, said shaft bearing being provided with a cylindrical passage to receive said support, a ball within said first bearing between said support and said lower end of said shaft, a second bearing supported by said upper casing, said second bearing having a cylindrical passage to receive the upper end of said shaft, a ball within said second bearing between said support and said upper end of said shaft, a plurality of blades mounted on said shaft within said lower casing, whereby fluid flow past said blades results in rotation of said shaft, a spool-shaped magnet in the lower end of said upper casing, said magnet positioned in a body of non-magnetic material, said magnet having spaced pole pieces, a plurality of first bars of magnetic material in said body radially extending in generally horizontal planes from said pole pieces, a coil enclosing said magnet and having terminal ends between which electrical pulses are generated, a cup-shaped member of non-magnetic material surrounding the exterior of said body and attached to said shaft, said member and said body removed from the path of fluid flow, a plurality of second bars of magnetic material within said member, said bars so positioned within said member as to complete a magnetic path between said pole pieces, said first bars, and said second bars whenever said second bars are adjacent said first bars, said member rotatable around said body whereby electrical pulses are generated, electrical lead means carried by said cable to conduct said electrical pulses to a point exterior said well bore, and amplifying and indicating means operatively connected with said last-mentioned means at the surface of said well bore.

References Cited in the file of this patent

UNITED STATES PATENTS

| | | |
|---|---|---|
| 817,887 | Tilden | Apr. 17, 1906 |
| 1,652,472 | Erwin | Dec. 13, 1927 |
| 2,127,847 | Schulte | Aug. 23, 1938 |
| 2,270,141 | Potter | Jan. 13, 1942 |
| 2,487,783 | Bergman | Nov. 15, 1949 |
| 2,649,712 | Dale | Aug. 25, 1953 |
| 2,654,433 | Piety | Oct. 6, 1953 |

FOREIGN PATENTS

| | | |
|---|---|---|
| 586,697 | France | Apr. 1, 1925 |
| 606,278 | Great Britain | Aug. 11, 1948 |